M. R. HUTCHISON.
PRESSURE INDICATING AND CONTROLLING MEANS.
APPLICATION FILED MAR. 16, 1911.
1,187,148.
Patented June 13, 1916.
3 SHEETS—SHEET 1.
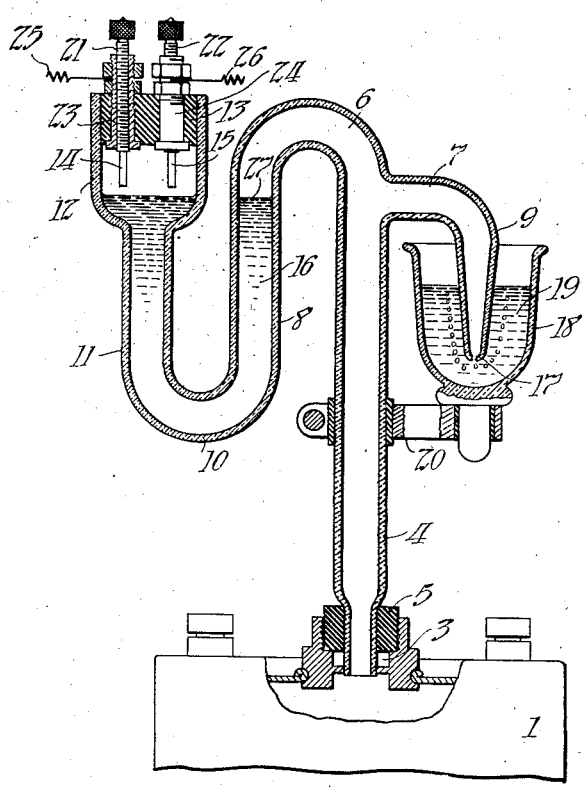
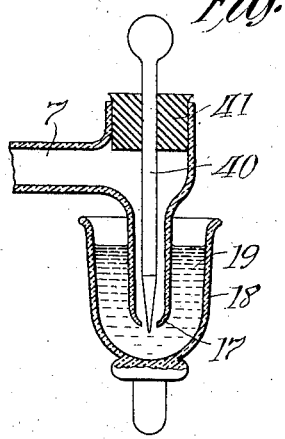
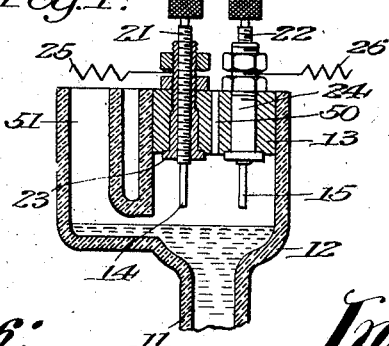
Witnesses:
Frank V. Lewis
A. C. Parham
Inventor:
Miller Reese Hutchison, by
Dyer Smith
his Atty.

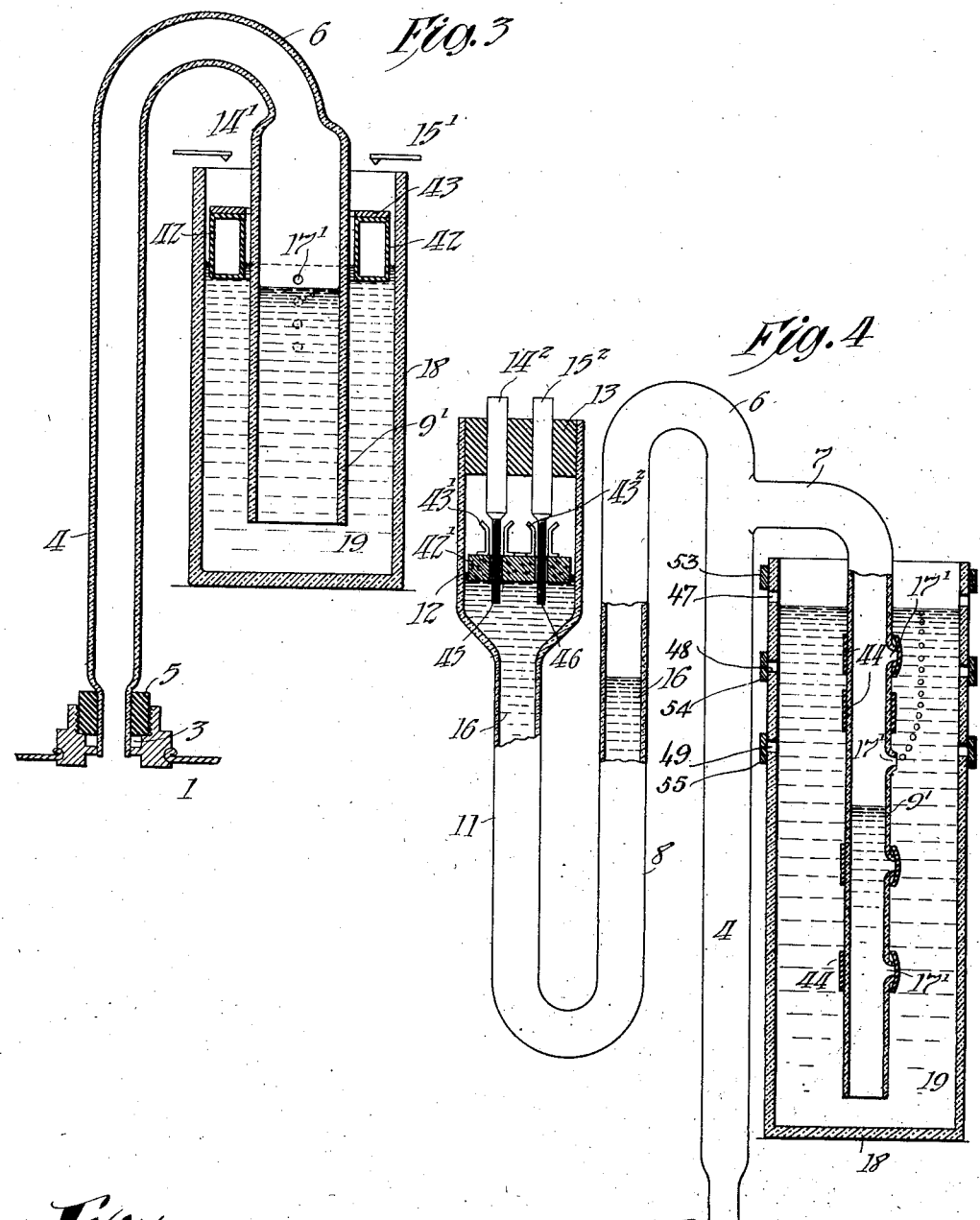

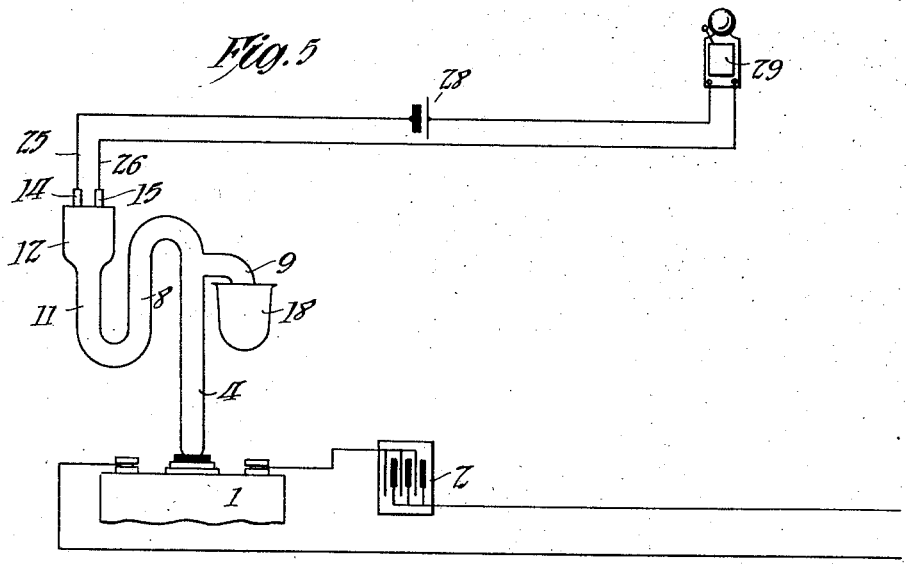
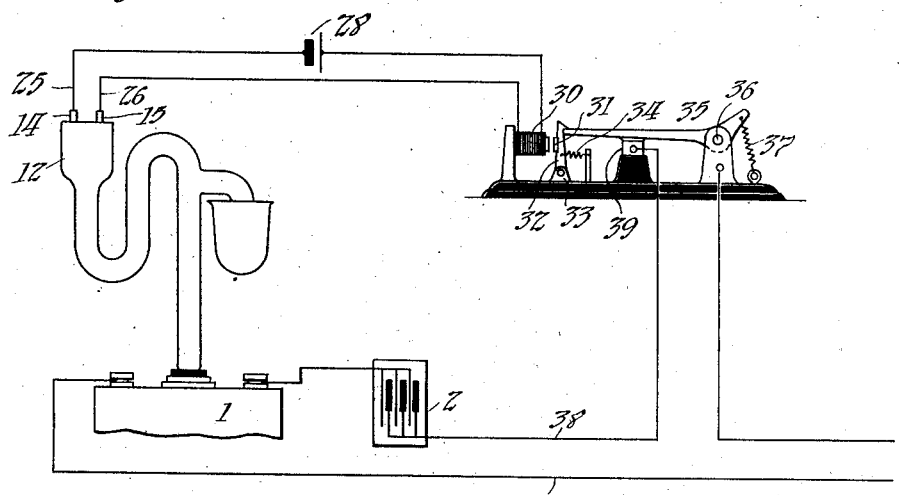

UNITED STATES PATENT OFFICE.

MILLER REESE HUTCHISON, OF SUMMIT, NEW JERSEY, ASSIGNOR TO EDISON STORAGE BATTERY COMPANY, OF WEST ORANGE, NEW JERSEY, A CORPORATION OF NEW JERSEY.

PRESSURE INDICATING AND CONTROLLING MEANS.

1,187,148.      Specification of Letters Patent.     Patented June 13, 1916.

Application filed March 16, 1911. Serial No. 614,843.

*To all whom it may concern:*

Be it known that I, MILLER R. HUTCHISON, a citizen of the United States, and a resident of Summit, in the county of Union and State of New Jersey, have invented certain new and useful Improvements in Pressure Indicating and Controlling Means, of which the following is a description.

My invention relates generally to apparatus for indicating abnormal pressure conditions of gases or liquids in a conduit and to a process for indicating such abnormal conditions.

My invention relates more particularly to a process for indicating when a storage battery has become fully charged or is being charged too fast, or that other abnormal conditions prevail during the charging of the same, and to apparatus for carrying out the said process.

My invention also relates to means and methods for positively preventing the overcharging of storage batteries, or of positively regulating the pressure of fluids in a conduit when desired.

The objects of my invention are to provide simple and effective means and methods such as those referred to.

In the practical operation of storage batteries, especially by those unskilled, considerable damage is done to the "lead" type of battery by overcharge, *i. e.*, continuing to charge the battery when it has become fully charged. In the "Edison" type of battery, while damage is not done to the battery, by overcharging, some of the water of the electrolyte is decomposed, and in any event, with any type of battery cell, current is wasted by overcharging. My invention makes provision either for indicating when a battery is fully charged or for automatically disconnecting the battery from the charging circuit when it is fully charged, or both.

It is well known to those versed in the art that a storage battery while being charged evolves gas much more rapidly when it is fully charged than when it is partially charged. It is also well known that a battery evolves gas more rapidly when being charged at a high rate than when being charged at a low rate. By my improved means and method these conditions can be indicated or abuse prevented.

In order that a clearer understanding of my invention may be had, attention is hereby directed to the accompanying drawings forming part of this specification and illustrating certain forms of apparatus embodying my invention and by which my improved process may be carried into effect.

In the drawings, Figure 1 illustrates in central vertical section one form of my apparatus positioned to operate in connection with a storage battery. Figs. 1ª and 2 represent in vertical section modified details of Fig. 1. Figs. 3 and 4 are views similar to Fig. 1 of modified forms of apparatus. Fig. 5 represents diagrammatically connections for indicating by means of a bell any pressure conditions which it is desired to indicate, and Fig. 6 is a diagrammatic view illustrating means for shutting off the charging current from a storage battery when the same has been fully charged, or otherwise when it is desired to interrupt the charging circuit.

Referring first to Figs. 1 and 2, 1 represents a cell of a storage battery, usually termed the "pilot" cell of the battery 2, shown in Figs. 5 and 6. Cell 1 is provided with an outlet 3 in which is positioned the lower end of a tube 4, the lower end of tube 4 being rigidly secured in place within opening 3, which is rendered gas-tight by means of the gasket 5 of cork or other desired material surrounding the reduced lower end of tube 4 and positioned tightly within opening 3. Cell 1 is gas-tight at all points other than opening 3, so that gas evolved during the charging of the cell must all escape through pipe 4. In the apparatus shown in Fig. 1, pipe 4 is provided with two branches 6 and 7, bending respectively to the left and the right and descending, as illustrated at 8 and 9. Branch 6 is formed with another elbow or bend 10 beyond the vertical portion 8 and thence again rises vertically, as shown at 11, terminating in the cup 12, the upper end of which is closed by suitable means, such as a cork 13 in which are supported the insulated conducting rods 14 and 15. The vertical members 8 and 11 and elbow 10 of the pipe, together with the lower portion of cup 12, contain a liquid 16, which should be a good electrical conductor, such as a saturated salt solution, a solution of caustic potash, or of sulfuric acid.

The downwardly extending portion 9 of branch 7 of tube 4 terminates in a small opening 17 of any desired calibrated size. Preferably, a cup or vessel 18 surrounds the lower end of portion 9 of the tube and the opening 17, therein, and is partly filled with a liquid 19, preferably pure water. Vessel 18 may be supported in any desired manner, as by means of the arm 20 adjustably secured to tube 4, as shown.

Closure 13 of cup 12 and rods 14 and 15 supported thereby are preferably all adjustable in height, or any of the same may be so adjustable. As shown, rods 14 and 15 are provided with screw threaded portions 21 and 22 engaging within threaded bushings 23 and 24 supported in the cork 13, whereby either or both the rods 14 and 15 may be adjusted any height. Electrical conditions 25 and 26 may be secured to rods 14 and 15 above the cork 13 by suitable clamping means, as shown.

In operation, when the battery 1 is being charged at a normal rate or at a rate less than normal, gas is given off by the cell 1 in such small quantity that it escapes through the calibrated opening 17 and bubbles up through liquid 19 as shown, without putting sufficient pressure on the upper surface 27 of the liquid 16 to cause the liquid to rise in cup 12 high enough to touch rods 14 and 15. The particular object of having the liquid 19 surrounding orifice 17 is to dissolve the caustic potash or other chemical carried over with the gas to prevent the same from clogging up the calibrated opening 17. The vessel 18 should preferably be large enough to hold a considerable quantity of liquid, so that the same would not become saturated with the caustic potash or other chemical during one complete charging operation.

When the battery evolves gas at an excessive rate, as will be the case when the same has been fully charged, the gas will not be able to escape through orifice 17 as rapidly as it is evolved, and therefore will exert pressure on the surface 27 of liquid 16 in the bend of the pipe to the left in Fig. 1, and cause the liquid to rise in cup 12 to connect rods 14 and 15 electrically. Conductors 25 and 26 connected to rods 14 and 15 may be connected in circuit with the battery or suitable source of electricity 28, in which is included some suitable device to be operated, as the bell 29 in Fig. 5, or the electromagnet 30 in Fig. 6. When the surface of the liquid in cup 12 rises into contact with rods 14 and 15, the circuit is completed, ringing the bell 29, if the same is used, thus indicating the abnormal pressure condition, or energizes the electromagnet 30, when the latter is used. In this case the armature 31 of the electromagnet is attracted thereto, this armature being attached to the lever 32 pivoted at 33 and being held by spring 34 normally in position to lock lever 35 pivoted at 36. On the actuation of the electromagnet, lever 35 is released and is forced upwardly by spring 37. As indicated in Fig. 6, battery 2 including pilot cell 1 is being charged by current supplied over circuit 38, 38, which circuit includes lever 35 and an insulated block 39 contacted by lever 35 when the latter is held in locked position by the pawl lever 32. When lever 35 is released by the actuation of magnet 30, the circuit is broken between block 39 and lever 35, thus automatically stopping the charging of the battery.

In place of bell 29, it is obvious that any other desired form of signaling or indicating apparatus might be used. It should also be noted that the movement of lever 35 in Fig. 6 acts as an indicating device, and that, accordingly, the apparatus may be considered broadly as operating an indicating device whether the same be a visible signal, audible alarm, or a movable switch.

It is obvious that the operation of the apparatus can be regulated as follows:—First, by raising or lowering closure 13 together with contacts 14 and 15 mounted therein as a unit. Second, by lowering closure 13 and raising either contact 14 or 15, so that one of the rods is always in the liquid and the other adjusted as desired. Third, by permitting closure 13 to remain in its normal position and lowering one of the rods sufficiently to permit the same always to be in contact with the conducting liquid and adjusting the other rod, as desired. Fourth, by putting a hole 50 through closure 13, as shown in Fig. 1ª, so that liquid 16 may rise in cup 12 without compressing air in the cup 12 between the surface of the liquid and the closure 13, the rise of the liquid then depending on the weight of the liquid only. Fifth, by connecting to cup 12 a suitable additional receptacle 51, as shown in Fig. 1ª, into which the liquid 16 may flow before its level is raised very materially. Sixth, by varying the size of orifice 17. Seventh, by varying the "head" of the liquid in vessel 18, whereby more or less pressure is created, which gas escaping from orifice 17 must overcome in escaping.

It is to be understood that I am not limited to the described means of regulating this apparatus, but that other means may be used. In Fig. 2, I have illustrated a means by which the size of orifice 17 can easily be regulated, consisting of the adjustable needle valve 40 mounted in a cork or closure 41 in the opening in tube 7 above the orifice 17.

While the device shown and described is suitable for the purpose, I consider the device as illustrated in Figs. 3 and 4 as in many respects preferable thereto. In the form of device shown in Fig. 3, the tube 4 is provided with a vertically descending branch 9′ which extends downwardly within liquid 19 in vessel 18. Branch 9′ of the tube has an open lower end and is provided with one or more openings 17′ extending through the side of tube 9′ into the receptacle 18. In this form of my device, the liquid 19 takes the place of the liquid 19 and also the liquid 16 used in the form illustrated in Fig. 1, the branch of the tube shown to the left in Fig. 1 being done away with and the device being correspondingly more simple.

Preferably, a plurality of openings 17′ are formed in tube 9′ at different short distances apart longitudinally of the tube. In this form of the device a cork or other float 42 floats upon the surface of the liquid in vessel 18 surrounding tube 9′, and may carry an annular metallic contact 43 upon the upper surface thereof adapted to connect together electrical contacts 14′ and 15′, when the float rises sufficiently to make contact between member 43 and contacts 14′ and 15′. Contacts 14′ and 15′ may be connected with an electrical circuit as previously described. When gas is evolved by the cell faster than it can escape from one or more of the orifices 17′ or all of the same combined, the liquid within tube 9′ is depressed by the pressure of the non-escaping gas and is forced out of the open lower end of the tube, causing the level of the liquid outside the tube and the float carried thereby to be correspondingly raised. If desired, the rise of the liquid in vessel 18 or of the float carried thereby might be used as a visual indicating means without the necessity of employing the contact means. By this device, it should also be noted, the possibility of the clogging up of the calibrated opening or openings is avoided, since any foreign matter carried by the gas will naturally fall through the open lower end of the tube 9′, and the wash of the liquid about the openings 17′ tends to keep the same clean. By this device also a good metallic contact may be formed between members 14′ and 15′ and 43 without depending upon a conducting liquid.

In Fig. 4 I have illustrated another form of my device in which metallic contacts may be made. In this form, as in that of Fig. 3, the large vertical tube 9′ extending downwardly into the liquid within vessel 18 is employed, this tube being provided with one or a plurality of openings 17′, as was described in connection with Fig. 3, the tube 9′ also being open at its lower end. I prefer to use a plurality of openings 17′, one below the other, any desired number of which may be closed by suitable means, as the rubber bands 44, which may be removably secured in position to close openings 17′. These holes 17′ may be at different depths below the surface of the liquid, as stated, and may be of different sizes. In the drawing I have illustrated the third hole 17′ from the top as being in operation, the other holes being closed. In the drawing the level of the liquid in tube 9′ is shown as depressed somewhat below the open orifice 17′ by the pressure of the gas, and the liquid 16 in cup 12 raised almost sufficiently to close the electrical contacts. In this form of the device, the contact rods $14^2$ and $15^2$ are illustrated as having reduced cylindrical portions 45 and 46, preferably of hard rubber or other insulating material secured to their lower ends and extending downwardly through holes in the cork or other float 42′, upon which are mounted the electrically connected annular contact members 43′ and $43^2$ adapted to connect contacts $14^2$ and $15^2$ electrically when the float rises sufficiently to bring rings 43′ and $43^2$ into contact with the rods $14^2$ and $15^2$, rods 45 and 46 acting as guiding means for the float 42′. It should be noted that the vertical tube 9′ in this form of device is longer than the column of liquid 16 in either tube 8 or tube 11, so that the liquid 16 is sure to be raised before the gas escapes out of the bottom of tube 9′.

The various holes 17′ in tube 9′ may be used, if desired, to successively come into activity as the pressure of the gas increases, and to act as automatic releases to take care of rapid charging rates for the battery when necessary, and may be so proportioned in size and placed at such distances below the surface of the liquid 19 that they will successively come into action. If this operation is followed, in case the top orifice 17′ becomes stopped up, the pressure of the gas will force the liquid downwardly in tube 9′ until the next vent 17′ is uncovered by the descending liquid in tube 9′, and this orifice will then permit the gas to escape. By arranging the holes 17′ only a short distance apart, the danger of stopping up of the same can be entirely eliminated, as the difference in height of the column of liquid 16 may be arranged to be slight even when the lowest hole 17′ is operating and all the rest are closed.

In the form of apparatus such as last described, the liquid 16 should preferably be pure water, since if any other liquid is used, the same may some time be caused, as by tilting, to run around elbow 6 and descend through pipe 4 into the battery. By making the tube 8 from the upper to the lower elbow longer than the column of liquid in the portion 11 of the tube, I lessen the probability of liquid 16 running into tube 4 and falling into the battery when the gas escapes rapidly through tube 9′, as may be the case when the battery is gassing violently.

If desired, the vessel 18, shown in Fig. 4, can be provided with holes such as 47, 48 and 49, extending therethrough and arranged at different heights. Bands or other means for covering these holes and rendering them inoperative, at will as 53, 54 and 55, may also be provided. By this means an opening or series of openings at any desired level may be left open, and the others closed, so that the receptacle 18 may be filled only to a desired level. This, in conjunction with the use of a desired outlet hole, as 17', in tube 9' regulates the "head" of pressure against which the gas flows out of tube 9', and thus forms a means of regulating the apparatus.

It is obvious that my apparatus as described in connection with the various figures may indicate to the attendant either that the battery is fully charged or that it is being charged too rapidly or that the electrolyte in the battery is too low, and that therefore the battery is gassing abnormally, or it may indicate any other condition which may cause abnormal evolution of gas. Or, as explained, such abnormal evolution may operate to throw a switch, breaking the charging circuit. Conditions of gassing which are abnormal for one rate might be normal for another rate, and therefore I prefer to make the extent of opening through which gas may normally pass adjustable as described.

In addition to acting as a battery indicating or controlling means, it is obvious that my apparatus may be used to indicate abnormal pressures of gases or liquids generally, and may be made to regulate by proper subsidiary apparatus.

In this application I will claim generically the various forms of apparatus by which my invention may be carried into effect, and also more specifically apparatus by which electrical devices are operated. I also will claim the method of indicating variation of pressures and the conditions of battery charging, which the apparatus described is adapted to carry out.

Having now described my invention, what I claim and desire to secure by Letters Patent is as follows:—

1. In a device of the character described, the combination with a pipe adapted to be connected with a source of gas or other fluid, having a restricted orifice opening therefrom, of a liquid situated beyond said orifice in the direction of flow of fluid in said pipe, adapted to be moved by the pressure upon the surface thereof of fluid passing said orifice, and indicating means operated by change in position of said liquid, substantially as described.

2. In a device of the character described, the combination of a vessel holding a liquid, indicating means operated by change in level thereof, and means for causing a stream of gas to press upon said liquid to change the level thereof when the pressure of the gas exceeds a given amount, and means for providing for the escape of the gas without affecting the level of the liquid when the pressure of the gas is below the given amount, substantially as described.

3. In a device of the character described, the combination of a vessel holding a liquid, a float carried by the liquid, contact means adapted to be connected by rise of the float, and a pipe for directing gas from a source thereof against a surface of said liquid to raise the same in said vessel, said pipe having a restricted orifice opening therefrom between said source and said liquid, substantially as described.

4. In a device of the character described, the combination of a vessel holding a liquid, a pipe for carrying gas from a source thereof, extending downwardly into said liquid and having a restricted orifice therein below the normal surface of said liquid, and indicating means adapted to be operated by excess gas pressure due to an increase in the rate of evolution of the gas from its source above the rate of efflux of gas through said orifice, substantially as described.

5. In a device of the character described, the combination of a vessel holding a liquid, a pipe for carrying gas from a source thereof, having a portion extending downwardly into said liquid, said portion having a plurality of orifices therein at different distances below the normal level of said liquid, and indicating means adapted to be operated by excess gas pressure due to an increase in the rate of evolution of the gas from its source above the rate of efflux of gas through one or more of said orifices, substantially as described.

6. In a device of the character described, the combination of a vessel holding a liquid, a pipe for carrying gas from a source thereof, having a portion extending downwardly into said liquid, said portion having an open lower end and having a restricted orifice in its side opening into said vessel, and indicating means adapted to be operated by excess gas pressure due to an increase in the rate of evolution of the gas from its source above the rate of efflux of gas through said orifice, substantially as described.

7. In a device of the character described, the combination of a vessel holding a liquid, a pipe for carrying gas from a source thereof, having a portion extending downwardly into said liquid, said portion having an open lower end above the bottom of said vessel, and having a restricted opening in its side, and indicating means rendered effective by upward movement of said liquid in said vessel caused by pressure of gas in said tube, substantially as described.

8. In a device of the character described, the combination of a vessel holding a liquid, a pipe for carrying gas from a source thereof, having a portion extending downwardly into said liquid, said portion having an open lower end above the bottom of said vessel, and having a restricted opening in its side, and a float carried by said liquid outside said tube, adapted to be raised by pressure of gas in said tube upon the surface of liquid in said tube, substantially as described.

This specification signed and witnessed this 14th day of March 1911.

MILLER REESE HUTCHISON.

Witnesses:
J. HAROLSON,
W. S. STEPHENSON.